US011119660B2

(12) United States Patent
Borlick et al.

(10) Patent No.: US 11,119,660 B2
(45) Date of Patent: Sep. 14, 2021

(54) DETERMINING WHEN TO REPLACE A STORAGE DEVICE BY TRAINING A MACHINE LEARNING MODULE

(71) Applicant: INTERNATIONAL BUSINESS MACHINES CORPORATION, Armonk, NY (US)

(72) Inventors: Matthew G. Borlick, Tucson, AZ (US); Karl A. Nielsen, Tucson, AZ (US); Clint A. Hardy, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 16/145,161

(22) Filed: Sep. 27, 2018

(65) Prior Publication Data
US 2020/0004435 A1   Jan. 2, 2020

Related U.S. Application Data

(63) Continuation of application No. 16/023,502, filed on Jun. 29, 2018.

(51) Int. Cl.
*G06F 3/06* (2006.01)
*G06F 12/00* (2006.01)
(Continued)

(52) U.S. Cl.
CPC .......... *G06F 3/0616* (2013.01); *G06F 3/0619* (2013.01); *G06F 3/0653* (2013.01);
(Continued)

(58) Field of Classification Search
CPC .... G06F 3/0616; G06F 3/0619; G06F 3/0653; G06F 3/0683
(Continued)

(56) References Cited

U.S. PATENT DOCUMENTS 6,745,303 B2   6/2004   Watanabe
6,981,070 B1   12/2005  Luk et al.
(Continued)

FOREIGN PATENT DOCUMENTS

CN   108108810 A   6/2018

OTHER PUBLICATIONS

PCT International Search Report and Written Opinion dated Oct. 12, 2019, pp. 9, for International Application No. PCT/IB2019/055213.
(Continued)

*Primary Examiner* — Mohamed M Gebril
(74) *Attorney, Agent, or Firm* — Konrad Raynes Davda & Victor LLP; David W. Victor

(57) ABSTRACT

Provided are a computer program product, system, and method for using a machine learning module to determine when to replace a storage device. Input on attributes of the storage device is provided to a machine learning module to produce an output value. A determination is made whether the output value indicates to replace the storage device. Indication is made to replace the storage device in response to determining that the output value indicates to replace the storage device.

24 Claims, 6 Drawing Sheets

(51) Int. Cl.
  *G06F 13/00* (2006.01)
  *G06F 11/07* (2006.01)
  *G06N 20/00* (2019.01)
  *G06F 11/30* (2006.01)

(52) U.S. Cl.
  CPC ........ *G06F 3/0683* (2013.01); *G06F 11/0727* (2013.01); *G06N 20/00* (2019.01); *G06F 11/3034* (2013.01); *G06F 2201/86* (2013.01)

(58) Field of Classification Search
  USPC ...................................................... 711/103
  See application file for complete search history.

(56) References Cited

U.S. PATENT DOCUMENTS

| | | | |
|---|---|---|---|
| 6,986,075 B2* | 1/2006 | Ackaret | G06F 11/008 714/4.5 |
| 7,236,911 B1 | 6/2007 | Gough et al. | |
| 7,890,815 B2 | 2/2011 | Hafner et al. | |
| 8,327,250 B1 | 12/2012 | Goel | |
| 8,351,289 B1 | 1/2013 | Brand et al. | |
| 8,468,244 B2 | 6/2013 | Redlich et al. | |
| 9,558,068 B1 | 1/2017 | Bono et al. | |
| 9,621,421 B1* | 4/2017 | Tolentino | H04L 43/16 |
| 9,678,817 B1* | 6/2017 | Hasbun Pacheco | G06F 11/0751 |
| 10,067,840 B1* | 9/2018 | Labaj | G06F 11/3058 |
| 10,216,422 B2 | 2/2019 | Kim et al. | |
| 10,419,530 B2* | 9/2019 | Halpern | H04L 41/0896 |
| 10,572,323 B1* | 2/2020 | Zhai | G06F 11/3034 |
| 10,613,962 B1 | 4/2020 | Delange | |
| 10,838,833 B1* | 11/2020 | Jibaja | G06F 11/0706 |
| 2004/0017629 A1 | 1/2004 | Lamberts et al. | |
| 2006/0149900 A1 | 7/2006 | Terry et al. | |
| 2006/0285409 A1 | 12/2006 | Hummler | |
| 2007/0022244 A1 | 1/2007 | Kimmery | |
| 2007/0179993 A1 | 8/2007 | Arruza | |
| 2009/0055357 A1 | 2/2009 | Richardson et al. | |
| 2009/0216910 A1* | 8/2009 | Duchesneau | H04L 41/04 709/250 |
| 2010/0046118 A1 | 2/2010 | Lee et al. | |
| 2010/0122146 A1 | 5/2010 | Nazarian et al. | |
| 2010/0217752 A1 | 8/2010 | Deenadhayalan et al. | |
| 2013/0128666 A1 | 5/2013 | Avila et al. | |
| 2014/0108855 A1 | 4/2014 | Gopakumar et al. | |
| 2014/0189440 A1* | 7/2014 | Ba | G06F 11/008 714/47.3 |
| 2015/0074450 A1* | 3/2015 | Blount | G06F 11/0727 714/6.1 |
| 2015/0310349 A1 | 6/2015 | Li | |
| 2015/0199243 A1 | 7/2015 | Wu et al. | |
| 2016/0041870 A1 | 2/2016 | Davis et al. | |
| 2016/0042024 A1* | 2/2016 | Campanotti | G06F 16/2365 707/694 |
| 2016/0092140 A1* | 3/2016 | Santaniello | G06F 9/5088 709/224 |
| 2016/0188424 A1* | 6/2016 | Walls | G06F 11/2064 714/6.3 |
| 2017/0039140 A1 | 2/2017 | Zhu | |
| 2017/0132525 A1* | 5/2017 | Rozier | G06Q 10/10 |
| 2017/0147436 A1* | 5/2017 | Borlick | G06F 11/1092 |
| 2017/0207981 A1 | 7/2017 | Maguire et al. | |
| 2018/0018582 A1 | 1/2018 | Unsal et al. | |
| 2018/0032398 A1 | 2/2018 | Hasegawa | |
| 2018/0081571 A1 | 3/2018 | Akshara | |
| 2018/0143762 A1 | 5/2018 | Kim et al. | |
| 2018/0174658 A1 | 6/2018 | Kikuchi | |
| 2018/0181087 A1* | 6/2018 | Komatsu | G05B 13/028 |
| 2018/0267858 A1 | 9/2018 | Bacha et al. | |
| 2018/0330258 A1* | 11/2018 | Harris | G06N 5/003 |
| 2018/0357535 A1* | 12/2018 | Shulkin | G11C 11/5642 |
| 2019/0050318 A1* | 2/2019 | Beltman | G06F 11/3428 |
| 2019/0095299 A1 | 3/2019 | Liu et al. | |
| 2019/0122096 A1* | 4/2019 | Husain | G06F 11/3495 |
| 2019/0235484 A1* | 8/2019 | Ristovski | G06N 20/00 |
| 2019/0278498 A1* | 9/2019 | Dedrick | G06F 3/0631 |
| 2019/0306121 A1 | 10/2019 | Anderson et al. | |
| 2020/0004434 A1 | 1/2020 | Borlick et al. | |
| 2020/0004435 A1* | 1/2020 | Borlick | G06F 3/0619 |
| 2020/0004437 A1 | 1/2020 | Borlick et al. | |
| 2020/0004439 A1 | 1/2020 | Borlick et al. | |
| 2020/0004623 A1 | 1/2020 | Borlick et al. | |
| 2020/0004625 A1 | 1/2020 | Borlick et al. | |
| 2020/0051347 A1 | 2/2020 | Bohl et al. | |
| 2020/0097921 A1 | 3/2020 | Ghosh et al. | |

OTHER PUBLICATIONS

English machine translation of CN108108810A dated Jun. 1, 2018, pp. 32.

U.S. Pat. No. 10,216,422 is the English language counterpart of CN108108810A.

Office Action dated Oct. 30, 2019, pp. 35, for U.S. Appl. No. 16/023,502.

Office Action dated Mar. 25, 2020, pp. 28, for U.S. Appl. No. 16/115,540.

Response dated Jun. 1, 2020, pp. 14, for Office Action dated Mar. 4, 2020, pp, 39, for U.S. Appl. No. 16/023,443.

Office Action dated Sep. 6, 2019, pp. 16, for U.S. Appl. No. 16/023,456, filed Jun. 29, 2018.

Office Action dated Sep. 18, 2019, pp. 13, for U.S. Appl. No. 16/115,540.

Office Action dated Apr. 16, 2020, pp. 45, for U.S. Appl. No. 16/103,545.

Notice of Allowance dated Mar. 31, 2020, pp. 21, for U.S. Appl. No. 16/023,456.

Office Action dated Mar. 4, 2020, pp, 39, for U.S. Appl. No. 16/023,443.

Response dated Jan. 30, 2020, pp. 14, to Office Action dated Oct. 30, 2019, pp. 35, for U.S. Appl. No. 16/023,502.

Final Office Action dated Feb. 27, 2020, pp. 34, for U.S. Appl. No. 16/023,502.

Anonymously, "Method for Self-Scrubbing ECC for Set-Associative Cache"; dated Feb. 13, 2007, An IP.com Prior Art Database Technical Disclosure, (online), retrieved from the Internet at URL>http://ip.com/IPCOM/000146495D, Total 4 pages.

Ryu, J. et al.; "Effects of Scrubbing on Reliability in Storage Systems"; Pohang University of Science and Technology; 2009.

"Special instructions to remove latent Parity Inconsistency (PI) errors and upgrade a disk drive to a new firmware version", Reference #: S1003638, dated Mar. 4, 2011, (online) retrieved from the Internet at URL> http://www-01.ibm.com/support/docview.wss?uid=ssg1S1003638 on May 17, 2018, Total 4 pages.

"How RAID-level disk scrubs verify data integrity", dated May 2013, (online) retrieved from the Internet at URL> https://library.netapp.com/ecmdocs/ECMP1196912/html/GUID-81F8BE on May 17, 2018.

Anonymously; "System and Method to do Data Scrubbing of RAID by Leveraging Array Workload Regularity"; dated Dec. 19, 2014., An IP.com Prior Art Database Technical Disclosure, (online) retrieved from the Internet at URL>http://ip.com/IPCOM/000239983D, Total 5 pages.

Anonymously, "System and Method of Array Scrub Adaptive Adjustment" dated Dec. 22, 2015, An IP.com 'Prior Art Database Technical Disclosure, (online) retrieved from the Internet at URL> http://ip.com/IPCOM/000244567D, Total 9 pages.

Barhate, D. et al., "Method for Logging Writes on Erasure Coded Storage System to Optimize the Network Usage Across Nodes for Data Updates"; dated Mar. 8, 2017, An IP.com Prior Art Database Technical Disclosure, (online), retrieved from the Internet at URL>http://ip.com/IPCOM/000249629D, Total 5 pages.

"Storage aggregate scrub", NetApp ONTAP9 Documentation Center, (online) retrieved from the Internet at URL> https://docs.netapp.com/ontap-9/index.jsp?topic=%2Fcom.netapp.doc.dot-cm-cmpr-920%2Fstorage_aggregate_scrub.html on May 17, 2018.

(56) References Cited

OTHER PUBLICATIONS

"S.M.A.R.T.", Wikipedia, (online), retrieved Jun. 20, 2018 from the Internet at URL>https://en.wikipedia.org/wiki/S.M.A.R.T., Total 20 pages.
U.S. Appl. No. 16/023,443, filed Jun. 29, 2018.
U.S. Appl. No. 16/103,545, filed Aug. 14, 2018.
Preliminary Amendment dated Aug. 14, 2018, pp. 12, for U.S. Appl. No. 16/103,545.
U.S. Appl. No. 16/023,456, filed Jun. 29, 2018.
U.S. Appl. No. 16/115,540, filed Aug. 28, 2018.
Preliminary Amendment dated Aug. 28, 2018, pp. 12, for U.S. Appl. No. 16/115,540.
U.S. Appl. No. 16/023,502, filed Jun. 29, 2018.
List of IBM Patents or Patent Applications Treated as Related, dated Oct. 2, 2018, pp. 2.
Preliminary Amendment dated Oct. 4, 2018, pp. 13, for U.S. Appl. No. 16/023,456.
Preliminary Amendment dated Oct. 4, 2018, pp. 9, for U.S. Appl. No. 16/023,502.
Response dated Dec. 6, 2019, pp. 13, to Office Action dated Sep. 6, 2019, pp. 16, for U.S. Appl. No. 16/023,456, filed Jun. 29, 2018.
Notice of Allowance dated Dec. 30, 2019, pp. 16, for U.S. Appl. No. 16/023,456, filed Jun. 29, 2018.
Response dated Dec. 18, 2019, pp. 11, to Office Action dated Sep. 18, 2019, pp. 13, for U.S. Appl. No. 16/115,540.
Amendment filed Apr. 27, 2020, pp. 14, to Final Office Action dated Feb. 27, 2020, pp. 34, for U.S. Appl. No. 16/023,502.
Office Action dated May 12, 2020, pp. 32, for U.S. Appl. No. 16/023,502.
Final Office Action dated Jun. 18, 2020, pp. 27, for U.S. Appl. No. 16/023,443.
Response dated Jul. 14, 2020, 15, to Office Action dated Apr. 16, 2020, pp. 45, for U.S. Appl. No. 16/103,545.
Response dated Aug. 13, 2020, pp. 15, to Office Action dated May 12, 2020, pp. 32, for U.S. Appl. No. 16/023,502.
Interview Summary dated Aug. 13, 2020, pp. 7, for U.S. Appl. No. 16/023,443.
Response dated Aug. 18, 2020, pp. 15, for Final Office Action dated Jun. 18, 2020, pp. 27, for U.S. Appl. No. 16/023,443.
Response dated Nov. 3, 2020, pp. 15, to Final Office Action dated Aug. 7, 2020, pp. 10, for U.S. Appl. No. 16/023,456.
Office Action dated Aug. 7, 2020, pp. 10, for U.S. Appl. No. 16/023,456.
Notice of Allowance dated Aug. 28, 2020, pp. 10, for U.S. Appl. No. 16/023,443.
Final Office Action dated Oct. 21, 2020, pp. 60, for U.S. Appl. No. 16/023,502.
Notice of Allowance dated Oct. 1, 2020, pp. 41, for U.S. Appl. No. 16/115,540.
Final Office Action dated Oct. 29, 2020, pp. 50, for U.S. Appl. No. 16/103,545.
Response dated Jun. 20, 2020, pp. 10, to Office Action dated Mar. 25, 2020, pp. 28, for U.S. Appl. No. 16/115,540.
Notice of Allowance3 dated Jan. 12, 2021, pp. 9, for U.S. Appl. No. 16/023,443.
Response dated Dec. 17, 2020, pp. 16, to Final Office Action dated Oct. 29, 2020, pp. 50, for U.S. Appl. No. 16/103,545.
Notice of Allowance dated Nov. 30, 2020, pp. 20, for U.S. Appl. No. 16/115,540.
Response dated Dec. 3, 2020, pp. 9, to Final Office Action dated Oct. 21, 2020, pp. 60, for U.S. Appl. No. 16/023,502.
Notice of Allowance dated Jan. 12, 2021, pp. 20, for U.S. Appl. No. 16/023,502.
GB Examination Report dated Feb. 15, 2021, pp. 5, for Application No. GB2100441.1.
Notice of Allowance dated Jan. 19, 2021, pp. 10, for U.S. Appl. No. 16/103,545.
U.S. Appl. No. 17/152,782, filed Jan. 19, 2021.
Preliminary Amendment dated Jan. 19, 2021, pp. 12, for U.S. Appl. No. 17/152,782.
Preliminary Amendment dated Feb. 3, 2021, pp. 9, for U.S. Appl. No. 17/152,782.
Notice of Allowance dated Feb. 10, 2021, pp. 44, for U.S. Appl. No. 16/023,456.
Office Action dated Jan. 29, 2021, pp. 18, for U.S. Appl. No. 16/115,540.
List of IBM Patents and Applications Treated as Related, dated Apr. 15, 2021 pp. 2.

* cited by examiner

DETERMINING WHEN TO REPLACE A STORAGE DEVICE BY TRAINING A MACHINE LEARNING MODULE

BACKGROUND OF THE INVENTION

1. Field of the Invention

The present invention relates to a computer program product, system, and method for using a machine learning module to determine when to replace a storage device.

2. Description of the Related Art

System administrators manage the lifecycle of storage devices employed in computing systems and servers to replace storage devices before the storage device fails to reduce the risk of data corruption resulting from failed storage devices. A computer drive monitoring system, such as SMART (Self-Monitoring, Analysis and Reporting Technology), monitors computer storage devices, such as hard disk drives (HDDs) and solid state drives (SSDs), to detect and report indicators of drive reliability for the purpose of anticipating imminent hardware failures. Software running on a host system may notify the user when SMART data indicates a possible failure so the user may replace the storage device to avoid data loss and maintain data integrity.

There is a need in the art for improved techniques for monitoring storage devices to predict storage devices that may fail and should be replaced to maintain data integrity.

SUMMARY

An embodiment comprises a computer program product, system, and method for using a machine learning module to determine when to replace a storage device. Input on attributes of the storage device is provided to a machine learning module to produce an output value. A determination is made whether the output value indicates to replace the storage device. Indication is made to replace the storage device in response to determining that the output value indicates to replace the storage device.

The above embodiment provides improved computer technology for determining when to replace a storage device using a machine learning module and algorithm to dynamically determine the expected remaining life of a storage device based on dynamic and static attributes of a storage device. The described embodiment provides accurate expected remaining life information the system administrator may use to determine when to replace a deployed storage device to maximize the operational life of a storage device and replace before failure.

In a further embodiment, an event at the storage device is detected. The input on the attributes is provided to the machine learning module in response to detecting the event.

In a further embodiment, the event comprises an error at the storage device.

In a further embodiment, the event comprises detecting that a measured age of the storage device comprises a predetermined percentage of an expected lifetime of the storage device.

With the above embodiments, the input is provided to the machine learning module in response to an event that tends to indicate an increased likelihood of disk failure, such as an error at the storage device or the measured age reaching a threshold level. Running the machine learning module in response to such events optimizes allocation of computational resources by invoking the machine learning module to determine an expected remaining life in response to events that may negatively impact the remaining life. In this way, information on expected remaining life is provided in response to occurrences that tend to reduce the remaining life, and increase a likelihood the remaining life has reached a point where replacement of the storage device is desirable.

In a further embodiment, providing the input on attributes of the storage device comprises periodically providing the input to the machine learning module to periodically produce the output value based on a time interval.

In a further embodiment, the output value from the machine learning module comprises a number from zero to one used to determine an expected remaining lifespan of the storage device.

In a further embodiment, the expected remaining lifespan comprises at least one of a time value, a number of write cycles, and number of writes per time period.

In a further embodiment, the attributes used as the input to the machine learning module include a plurality of: a response time to respond to read and write requests to the storage device; a response time to respond to read and write requests to a storage array including the storage device; for each of at least one error type, a number of errors of the error type in a specified time interval; a type of the storage device; a manufacturer of the storage device; a storage capacity of the storage device; a time of first use of the storage device; a firmware level of the storage device; a read operations per second at the storage device; an expected remaining lifespan of the storage device; and write operations per second at the storage device.

With the above embodiments, the machine learning module is run to determine an expected remaining life for a storage device based on current dynamic operating conditions at the storage device and static characteristics of the storage device in the storage device information. In this way, a determination of an expected remaining life takes into account current usage and operating conditions at the storage device.

An additional embodiment provides a computer program product, system, and method for determining when to replace a storage device deployed within a computing environment. Dynamic attributes for the storage device in response to access requests to the storage device are updated. A failure of the storage device is detected. In response to detecting the failure of the storage device, a determination is made of input comprising the dynamic attributes of the storage device that failed. The input is used to train a machine learning module to produce an output value indicating no expected remaining life of the storage device. After training the machine learning module for the storage device that failed, the machine learning module is executed to produce an output value based on dynamic storage attributes of an operational storage device to determine an expected remaining life of the operational storage device.

With the above embodiment, the machine learning module is trained to produce an output value reflecting actual remaining life of the failed storage device when the storage device fails. In this way, the machine learning module is trained to recognize a failed storage device based on the dynamic and static operating conditions in effect when the storage device failed, and likely to accurately reflect the conditions that resulted in failure. This improves the accuracy of the machine learning module by being trained based on real time conditions of the storage device that the machine learning module is designed to recognize.

In a further embodiment, training the machine learning module comprises executing the machine learning module with the input to produce a current output value of the storage device that failed; determining a margin of error of the current output value and an output value indicating no expected remaining life of the storage device that failed; and using the margin of error and the input to train weights and biases of nodes in the machine learning module to produce the output value indicating no expected remaining life of the storage device.

In a further embodiment, dynamic storage attributes for the storage device are stored at different time periods. In response to detecting the failure of the storage device, for each stored dynamic storage attributes at a time period of a plurality of the stored dynamic storage attributes at the different time periods, a determination is made of an actual remaining life as a function of a time the storage device failed and the time period of the stored dynamic storage attributes. The dynamic storage attributes are used to train the machine learning module to produce an output value indicating the actual remaining life of the storage device that failed at the time period of the stored dynamic storage attributes.

With the above embodiment, the machine learning module is trained to produce an output value reflecting actual remaining life of the failed storage device at different points-in-time based on the historical storage device information existing at those different points-in-time. This trains the machine learning module to more accurately predict the expected remaining life of the storage device at various given points-in-time prior to failure based on the dynamic and static attributes of the storage device occurring in real time at the different points-in-time.

In a further embodiment, to train the machine learning module for each stored dynamic storage attributes at a time period comprises executing the machine learning module with the dynamic storage attributes at the time period to produce a current output value for the time period; determining a margin of error of the current output value for the time period and the actual remaining life of the storage device that failed at the time period of the stored dynamic storage attributes; and using the margin of error and the input to train weights and biases of nodes in the machine learning module to produce an output value corresponding to the actual remaining life of the storage device.

In a further embodiment, the input further includes static storage attributes that do not change over time.

In a further embodiment, the machine learning module produces output values from dynamic storage attributes for storage devices used by different computing systems. Each computing system maintains dynamic storage attributes for the storage devices used at the computing system. Dynamic storage attributes are received for the storage devices at the computing systems. The machine learning module is trained with the dynamic storage attributes from the computing systems for storage devices that failed at the computing systems. After training the machine learning module for the storage devices that failed deployed at the computing systems, the machine learning module is executed to produce output values for the computing systems based on dynamic storage attributes of operational storage devices at the computing system to determine an expected remaining life of each of the operational storage devices deployed at the computing systems.

With the above embodiment, the machine learning module accuracy is increased by being trained from operational parameters at multiple storage device locations. This allows more accurate output values and to provide the output values to different groups of users.

DETAILED DESCRIPTION

System administrators want to manage storage devices in their systems to maximize deployed use to obtain the greatest return on investment and at the same time monitor performance parameters to time the replacement of storage devices before failure to prevent data loss. Described embodiments provide improved computer technology for determining when to replace a storage device using a machine learning module and algorithm to dynamically determine the expected remaining life of a storage device based on dynamic and static attributes of a storage device. The machine learning module may continually be retrained to improve the predictive accuracy of determining an expected remaining life of a storage device that an administrator may consider to determine when to replace the storage device. In this way, the described embodiments provide accurate expected remaining life information the system administrator may use to determine when to replace deployed storage device to maximize the operational life of a storage device and replace before failure.

Figure 1:
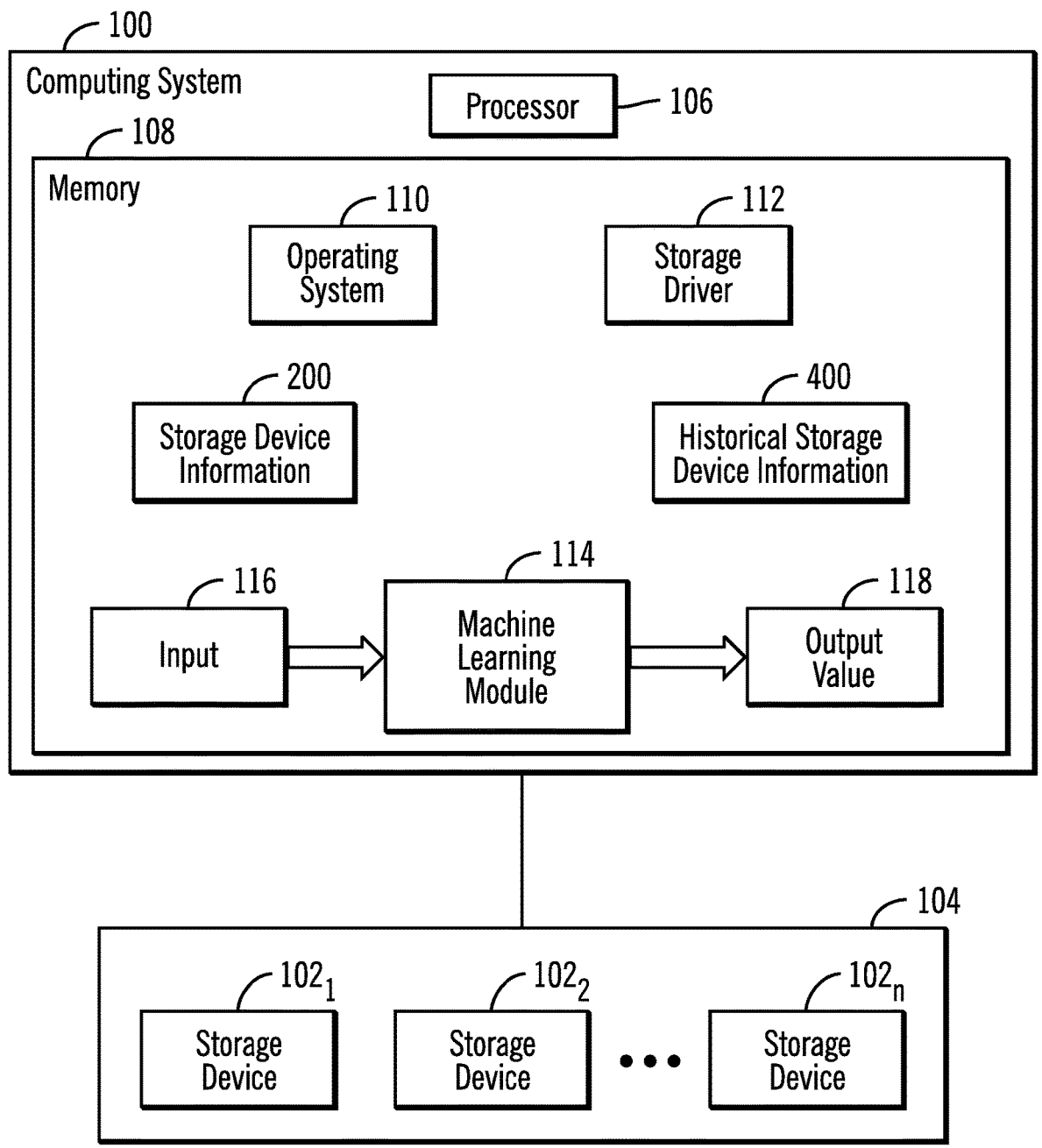
FIG. 1 illustrates an embodiment of a computing environment.

FIG. 1 illustrates an embodiment of a computing environment. A computing system 100 accesses data in one or more storage devices $102_1$, $102_2$ . . . $102_n$ in a storage enclosure 104, such as Input/Output (I/O) bays, a storage array, a storage system, etc., which may be within the housing of the computing system 100, on the computing system 100 motherboard or coupled to the computing system 100 via a network or cable. The computing system 100 includes a processor 106 and a memory 108. The processor 106 may comprise one or more central processing units (CPUs) or a group of multiple cores on a single CPU. Alternatively, the computing system 100 may comprise a storage controller that processes Input/Output (I/O) access requests for tracks in the storage devices $102_1$, $102_2$ . . . $102_n$ from hosts connecting to the computing system 100 (storage controller) over a network.

The memory 108 further includes an operating system 110 to manage requests from internal processes in the computing system 100 and/or external hosts for tracks in the storage devices $102_1$, $102_2$ . . . $102_n$. A storage driver 112 provides an interface between the operating system 110 and the storage devices $102_1, 102_2 \ldots 102_n$ to provide access to the hardware of the storage devices $102_1, 102_2 \ldots 102_n$ and to manage transfer of read and write requests to tracks stored in the storage devices $102_1, 102_2 \ldots 102_n$. A track may comprise any unit of data configured in the storage devices $102_1, 102_2 \ldots 102_n$, such as a track, Logical Block Address (LBA), etc., which is part of a larger grouping of tracks, such as a volume, logical device, etc.

The storage driver 112 maintains storage device information 200 having static and dynamic information on current operational parameters at the storage devices $102_1, 102_2 \ldots 102_n$. The storage driver 112 further maintains historical storage device information 400 comprising instances of the storage device information 300 at different time periods.

The memory 108 may further include a machine learning module 114 that implements a machine learning technique such as decision tree learning, association rule learning, neural network, inductive programming logic, support vector machines, Bayesian models, etc., to receive as input 116 certain of the storage device information 200 to generate an output value 118 or confidence level, such as a value between 0 and 1, that indicates an expected remaining lifespan of the storage device. This expected remaining lifespan may be reported via a user interface to the system administrator to consider to determine whether a storage device $102_i$ should be replaced.

In one embodiment, the machine learning module 114 may comprise an artificial neural network programs trained using back propagation to adjust weights and biases at nodes in a hidden layer of the first artificial neural network program to produce an output value 118 based on input 116 comprising storage device attributes from storage device information 200. Back propagation may comprise an algorithm for supervised learning of artificial neural networks using gradient descent. Given an artificial neural network and an error function, the method may calculate the gradient of the error function with respect to the neural network's weights and biases.

The operating system 110, storage driver 112, and the machine learning module 114 are shown in FIG. 1 as program code loaded into the memory 108 and executed by the processor 106. Alternatively, some or all of the functions may be implemented in hardware devices in the system 100, such as in Application Specific Integrated Circuits (ASICs) or executed by separate dedicated processors.

The storage devices $102_1, 102_2 \ldots 102_n$, comprise storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices $102_1, 102_2 \ldots 102_n$ in the storage enclosure 104 may be configured into an array of devices, such as Just a Bunch of Disks (JBOD), Direct Access Storage Device (DASD), Redundant Array of Independent Disks (RAID) array, virtualization device, etc. Further, the storage devices $102_1, 102_2 \ldots 102_n$ may comprise heterogeneous storage devices from different vendors or from the same vendor.

The memory 108 may comprise a suitable volatile or non-volatile memory devices, including those described above.

Figure 2:
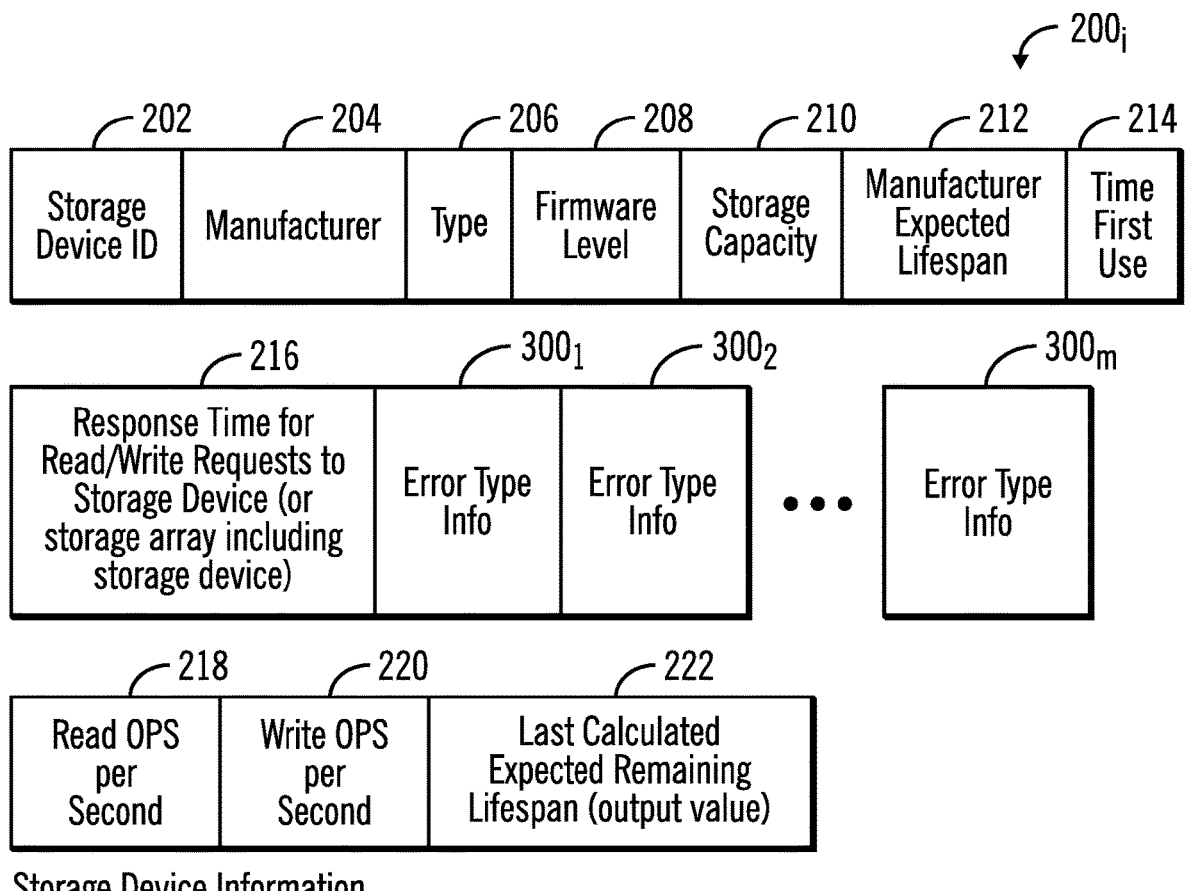
FIG. 2 illustrates an embodiment of storage device information.

FIG. 2 illustrates an embodiment of an instance of storage device information $200_i$ for a storage device $102_i$ and includes a storage device identifier (ID) 202 of a storage device, such as a unique identifier; a manufacturer 204 of the storage device 202; a type 204 of the storage device 206, such as hard disk drive, SSD, and other design factors, such as throughput, data transfer or bus interface, etc.; a firmware level 208; a storage capacity 210; a manufacturer expected lifespan 212 provided in manufacturer specifications; a time of first use 214 or access to the storage device 202; a response time 216 for read and write requests to the storage device 202 (or a storage array, e.g., RAID array, including the storage device 202; error type information $300_1, 300_2 \ldots 300_m$ having information on detected errors; read operations ("OPS") per second 218 rate measured for a last number of writes (N) tracked at the storage device 202; and write operations per second 220 rate measured for the last number of writes (N) tracked at the storage device 202; and a last calculated expected remaining lifespan 222 (or output value) calculated by the machine learning module 114. The storage device information $200_i$ includes static information, such as 202, 204, 206, 208, 210, 212, 214, and dynamic information that may be continually updated, such as in blocks 216, $300_1, 300_2 \ldots 300_m$, 218, 220, and 222. The dynamic information, other than the error type information $300_1, 300_2 \ldots 300_m$, may be updated after every read or write access to the storage device 202. The error type information $300_1, 300_2 \ldots 300_m$ may be updated after every detected error.

Figure 3:
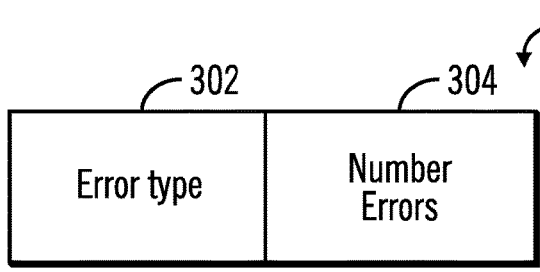
FIG. 3 illustrates an embodiment of error type information.

FIG. 3 illustrates an embodiment of an instance of the error type information $300_j$, such as instances $300_1, 300_2 \ldots 300_m$ in the storage device information $200_1$ for a storage device and indicates an error type 302, e.g., corrupted data, bad sectors, Self-Monitoring, Analysis and Reporting Technology (S.M.A.R.T) errors, operating system 110 crashes, etc., and a number of occurrences 304 of the error type 302 for a time interval. The number of occurrences 304 may be periodically reset at the end of a time interval.

Figure 4:
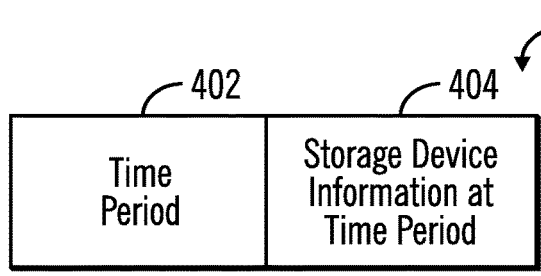
FIG. 4 illustrates an embodiment of historical storage device information.

FIG. 4 illustrates an embodiment of an instance of historical storage device information $400_{i,t}$ for storage device $102_i$ at a time period (t), and includes a time period 402 at which storage device information $200_i$ was updated and the storage device information 404 comprising storage device information $200_i$ gathered at the time period 402. The historical storage device information 400 may include information for all the storage devices $102_1, 102_2 \ldots 102_n$ accessed by the computing system 100.

Figure 5:
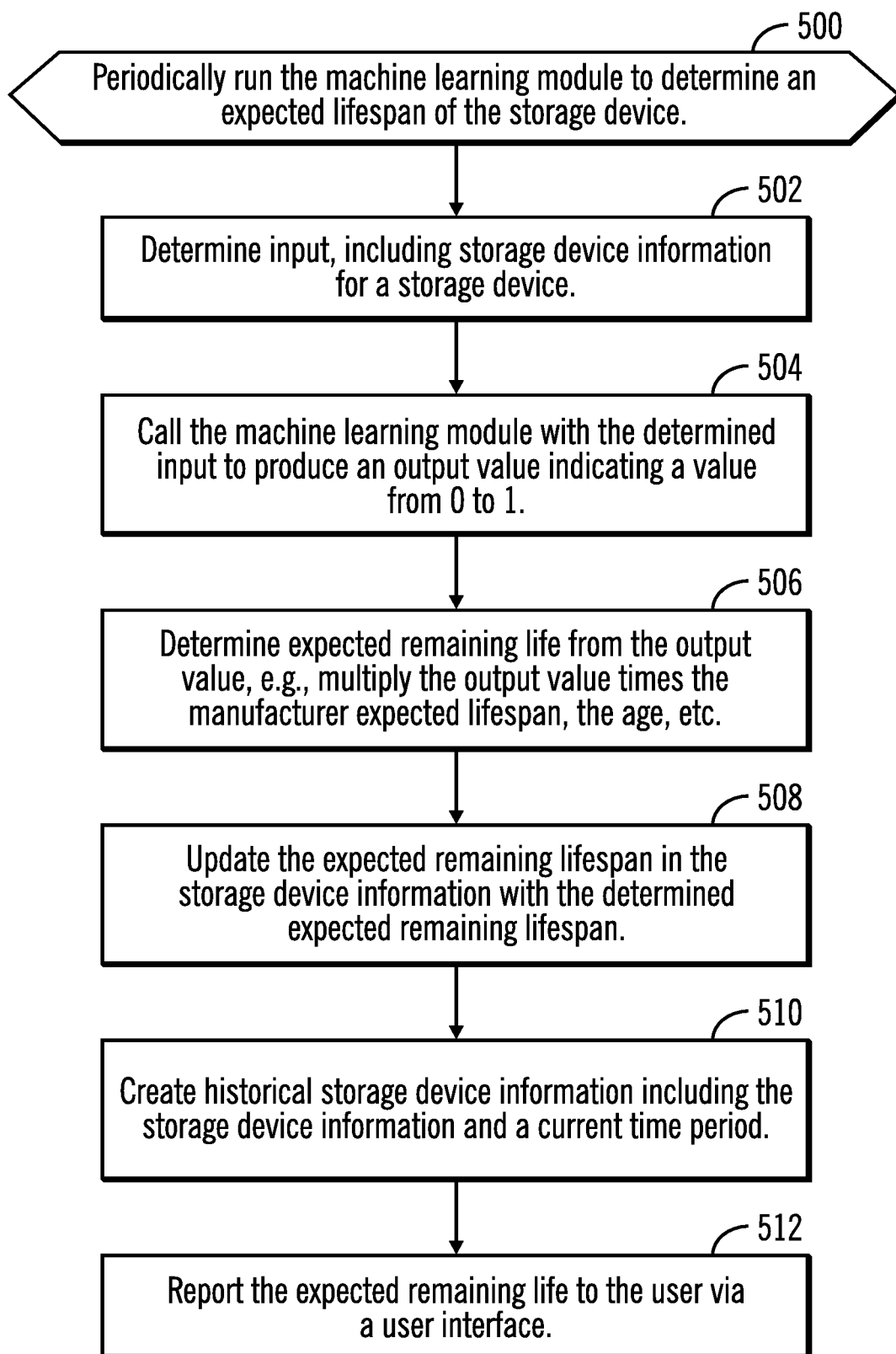
FIG. 5 illustrates an embodiment of operations to periodically run a machine learning module to determine expected remaining life of a storage device.

FIG. 5 illustrates an embodiment of operations performed by the storage driver 112 and/or machine learning module 114 to periodically run the machine learning module 114 to determine the expected remaining life of a storage device $102_i$ that may be used to determine whether to replace the storage device $102_i$. The machine learning module 114 may be periodically run at time intervals or in response to events, such as an error at the storage device $102_i$, detecting that the measured age (current system time, as supplied by a system 100 clock, minus a time of first use 214) is a predetermined percentage of expected lifetime of the storage device 102i, etc. Upon invoking (at block 500) the machine learning module 114, input 116 is determined (at block 502) from the storage device information 200—such as dynamic and static storage device information $200_i$, for a storage device $102_i$. The machine learning module 114 is called (at block 504) with the determined input 116 to produce an output value 118 indicating a value from 0 to 1 that may indicate or be used to determine an expected remaining life of the storage device $102_i$. A determination is made (at block 506) of the expected remaining life from the output value 118, such as by multiplying the output value 118 times the manufacturer expected lifespan 212, or using the output value 118 in a function with another variable, such as the current age, comprising a current time minus the time of first use 214. Other functions may also be used to calculate an expected remaining life from the output value 118. The expected remaining lifespan field 222 is updated (at block 508) with the determined expected remaining lifespan. An instance of historical storage device information $400_i$ is created (at block 510) including the storage device information $200_i$ used for the input 116 as the storage device information 404 and a current time period as the time period 402 of the storage device information 404. The expected remaining life may then be reported (at block 512) to a user via a user interface to allow the administrator or user to determine whether to replace the storage device $102_i$ based on the calculated expected remaining life.

With the embodiment of FIG. 5, the machine learning module 114 is run to determine an expected remaining life for a storage device $102_i$ based on a trained machine learning algorithm that determines an expected remaining life based on current dynamic operating conditions at the storage device $102_i$, e.g., 216, $300_i$, 218, 220, 222, static characteristics of the storage device, e.g., 202, 204, 206, 208, 210, 212, 214, etc. in the storage device information $200_i$, and statistical and probabilistic models that relate such operating conditions to a likelihood of data set inconsistency. In this way, a determination of an expected remaining life takes into account current usage and operating conditions. For instance, a slower response time 216 and a high number of critical types of errors indicated in the error type information $300_i$ may indicate a likelihood of less expected remaining life than would be expected based on the manufacturer expected lifespan 212, which is based on average operating conditions, not device specific conditions. Further, higher response times 216 and the lack of a significant number and type of errors, as indicated in the error type information $300_i$, may indicate a likelihood of more expected remaining life than would be expected based on the manufacturer expected lifespan 212. The machine learning algorithm may further be able to predict the amount the expected remaining lifespan will differ from the manufacturer expected lifespan 212. This will provide more accurate information to a user on the expected remaining life to allow the user to better determine when to replace a storage device in a manner that experiences maximum duration of usage of the storage device and replacement before failure to minimize risk of data loss.

In the embodiment of FIG. 5, the output value 118 may comprise a value between 0 and 1 that relates to an expected remaining life of the storage device $102_i$. In an alternative embodiment, the output value 118 may comprise one of two values, indicating to replace or not replace the storage device $102_i$.

Figure 6:
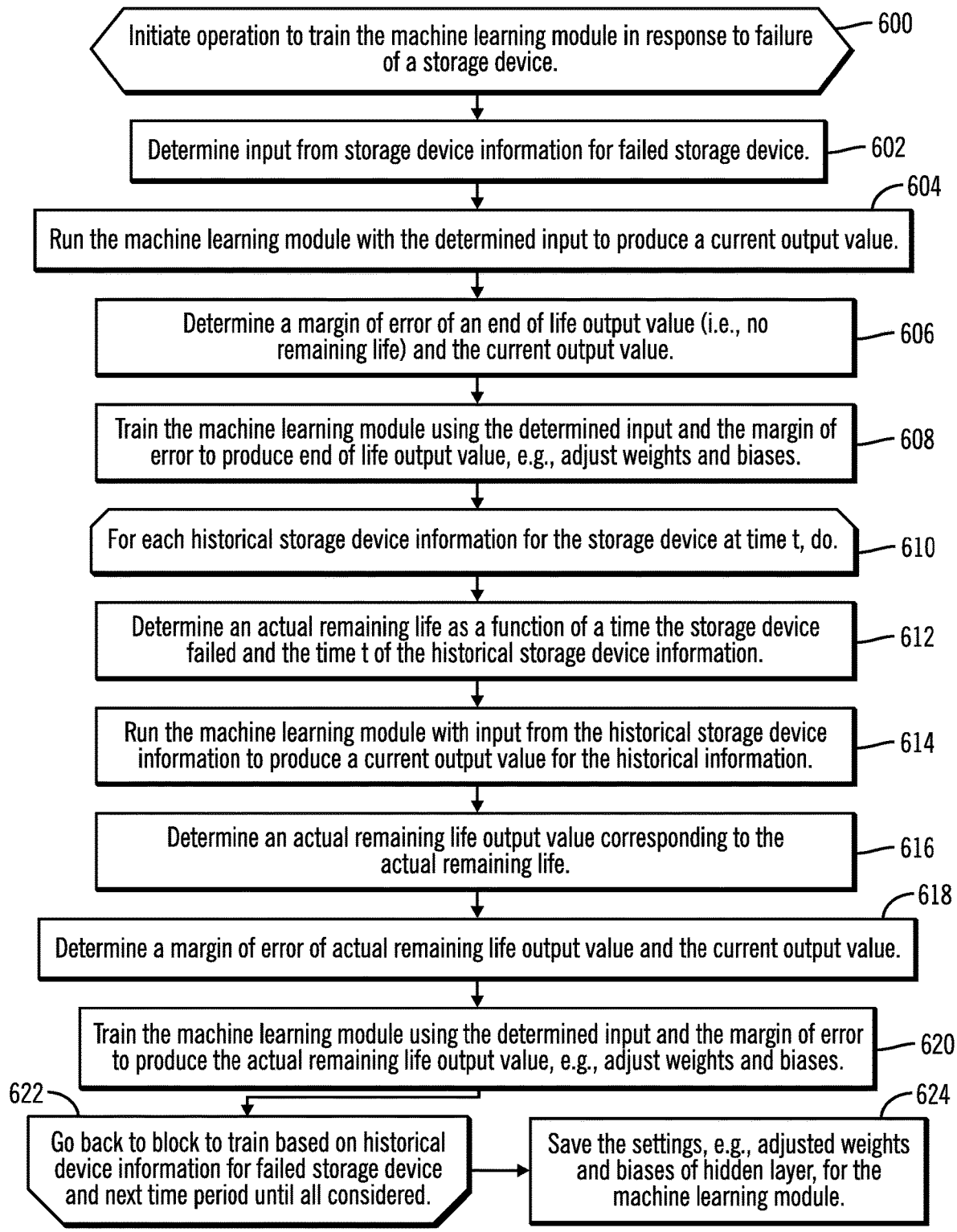
FIG. 6 illustrates an embodiment of operations to train the machine learning module to predict the expected remaining life of storage devices.

FIG. 6 illustrates an embodiment of operations performed by the storage deriver 112 and/or machine learning module 114 to retrain the machine learning module 114 upon detecting a failure of a storage device $102_i$ to produce an output value 118 more predictive of an expected remaining life of a storage device $102_i$ given that the life of the storage device has now been definitively determined due to its failure. Upon detecting the failure of a storage device $102_F$, the storage driver 112 determines (at block 602) as input 116 the attributes of the failed storage device $102_F$ as reflected in the dynamic and static storage device attributes in the storage device information $200_F$ for the failed storage device $1020_F$.

The machine learning module 114 is run (at block 604) with the determined input 116 to produce a current output value 118. A determination is made (at block 606) of a margin of error of an end of life output value (reflecting no remaining life in the storage device $102_F$) and the current output value 118. The machine learning module 114 is trained (at block 608) using the determined input 116 and the margin of error, and other information, to produce a desired output value 118. The machine learning module 114 may be trained using back propagation to reduce the margin of error, to produce the desired output value. In embodiments where the machine learning module 114 algorithm comprises an artificial neural network, a backward propagation routine may be used to retrain the machine learning module 114 to produce the desired output value 118. For other types of machine learning algorithms, such as Bayesian models, other techniques may be used to retrain the machine learning module 114 to produce the desired output value.

In certain embodiments, the machine learning module 114 may further be trained at blocks 610 through 622 to produce output values based on the historical storage device information $400_{F,t}$ for the failed storage device $102_F$ captured at different time periods (t), where the output value would be based on the actual remaining life for the failed storage device $102_F$ at the time period (t) 402 of the historical storage device information $400_{F,t}$. This allows further fine grained training of the machine learning module 114 to calculate output values for different actual remaining life periods. A loop of operations is performed at blocks 610 through 622 for each instance of historical storage device information $400_{F,t}$ for the failed storage device $102_F$ saved at one of a plurality of time periods (t). At block 612, the storage driver 112 (or machine learning module 114) determines an actual remaining life at time period (t) as a function of a time the storage device $102_F$ failed and the time (t) 402 of the historical device information $400_{F,t}$ being considered.

The machine learning module 114 is run (at block 614) with input 116 determined from the historical storage device information $400_{F,t}$ to produce a current output value 118, which does not consider the data point of the storage device $102_F$ failure. A determination is made (at block 616) of an actual remaining life output value $118_A$ corresponding to the actual remaining life of the storage device $102_F$ at the time period (t) 402 of the historical device information $400_{F,t}$, which would comprise the time of failure of the storage device $102_F$ minus the time (t) 402. A determination is made (at block 618) of a margin of error of the output value $118_A$ for the actual remaining life of the storage device $102_F$ at historical time period (t) 402 and the current output value 118. The machine learning module 114 is trained (at block 620) using the input 116 from the historical storage device information $400_{F,t}$ and the margin of error, and other information, to produce the actual remaining life output value $118_A$. The machine learning module 114 may be trained using back propagation to reduce the margin of error, to produce the desired output value.

After training the machine learning module 114 for the failed storage device $102_F$ using the current storage device information $200_F$ and optionally the historical storage device information $400_{F,t}$, the settings, e.g., adjusted weights and biases of the hidden layer of the machine learning module 114, are then saved (at block 624) for later us.

With the embodiment of FIG. 6, the machine learning module 124 is retrained to produce an output value reflecting actual remaining life of the failed storage device $102_F$ at different points in time based on the historical storage device information $400_{F,t}$ existing at those different points-in-time to have the machine learning module 124 more accurately predict the expected remaining life of the storage device $102_i$ at a given point in time based on the dynamic and static attributes of the storage device $102_i$.

Figure 7:
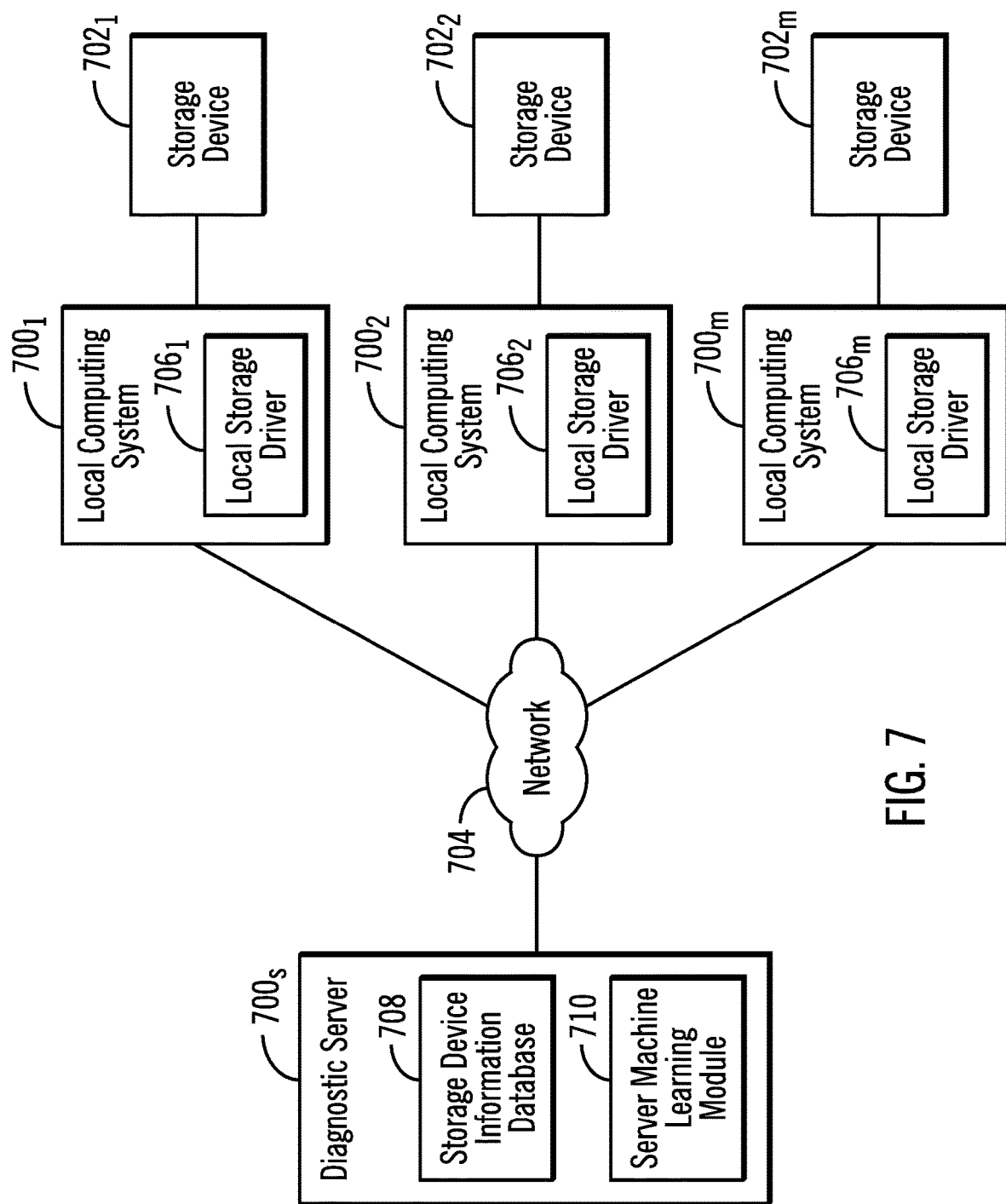
FIG. 7 illustrates an additional embodiment of a computing environment including a plurality of computing systems and a diagnostic server.

FIG. 7 illustrates an additional embodiment where the computing system 100 described with respect to FIGS. 1-6 is implemented in a diagnostic server $700_S$ and a plurality of local computing systems $700_1, 700_2 \ldots 700_m$ each managing access to one or more a storage devices $702_1, 702_2 \ldots 702_m$. The diagnostic server $700_S$ communicates with the local computing systems $700_1, 700_2 \ldots 700_m$ over a network 704, such as world wide web (WWW), a local area network (LAN), wide area network (WAN), storage area network (SAN), etc. The local computing systems $700_1, 700_2 \ldots 700_m$ include a local storage driver $706_1, 706_2 \ldots 706_m$ to perform the operations of the storage driver 112 in FIGS. 1, 5, and 6 to gather storage device information $200_i$ and historical storage device information $400_{i,t}$ for the managed storage devices $702_1, 702_2 \ldots 702_m$. The local storage drivers $706_1, 706_2 \ldots 706_m$ may transmit the gathered storage device information $200_i$ and historical storage device information $400_{i,t}$ to the diagnostic server $700_s$ to store in a storage device information database 708, and then upon learning that one of the local storage devices $702_1, 702_2 \ldots 702_m$ failed, perform the machine learning training operations of FIG. 6 using a server machine learning module 710, similar to the machine learning module 114. In this way, the server machine learning module 710 may be more frequently trained and hence more accurate because it is trained from operational parameters in multiple storage device locations $702_1, 702_2 \ldots 702_m$.

In certain embodiments, the diagnostic server $700_S$ may be operated by a vendor or manufacturer or the storage devices or may comprise a web service providing expected remaining life information heterogeneous storage devices from different manufacturers and for different types of storage devices, e.g., SSD, hard disk drive, etc.

In the described embodiment, variables "i", "m", "n", "t", etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
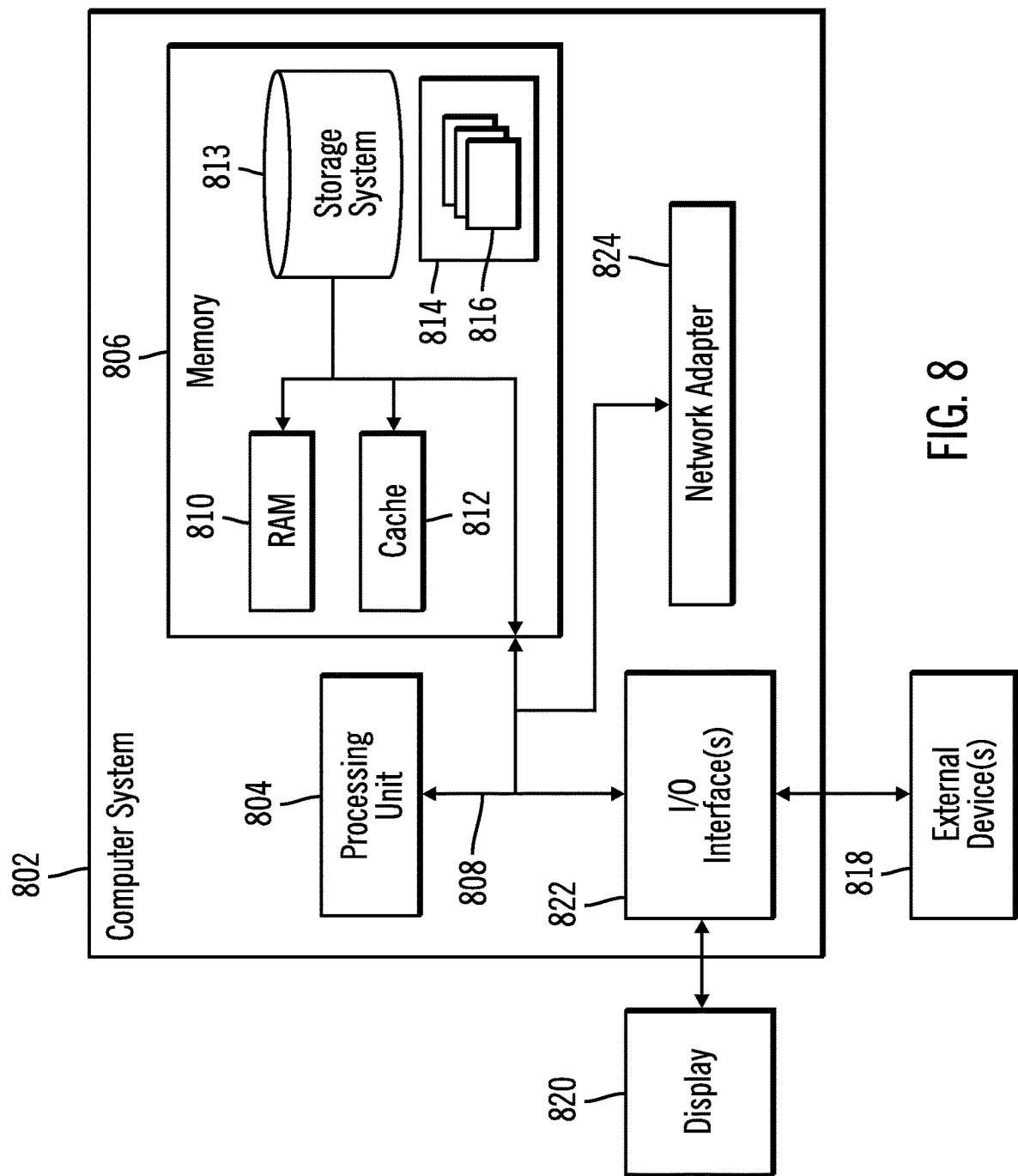
FIG. 8 illustrates a computing environment in which the components of FIGS. 1 and 7 may be implemented.

The computational components of FIGS. 1 and 7, including the computing system 100, diagnostic server 700$_S$, and local computing systems 700$_1$, 700$_2$ . . . 700$_m$ may be implemented in one or more computer systems, such as the computer system 1102 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 816. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 860, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 862. Still yet, computer system/server 802 can communicate with one or more networks such as a local area network (LAN), a general wide area network (WAN), and/or a public network (e.g., the Internet) via network adapter 864. As depicted, network adapter 864 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining when to replace a storage device deployed within a computing environment, the computer program product comprising a computer readable storage medium storing computer readable program code that when executed performs operations, the operations comprising:
    updating storage attributes for the storage device in response to access requests to the storage device;
    training a machine learning module to produce output values indicating remaining life at different times based on input comprising the storage attributes for the storage device at the different times;
    after training the machine learning module, detecting a failure of the storage device;
    in response to detecting the failure of the storage device, performing:
        determining input comprising the storage attributes of the storage device that failed; and
        using the input to retrain the machine learning module to produce a first output value indicating no expected remaining life of the storage device, wherein the machine learning module is retrained at multiple points-in-time to improve a predictive accuracy of determining the expected remaining life to determine when to replace the storage device, including predictive accuracy of determining no expected remaining life; and
    after the retraining the machine learning module for the storage device that failed, executing the machine learning module to produce a second output value based on current storage attributes of an operational storage device to determine an expected remaining life of the operational storage device.

2. The computer program product of claim 1, wherein to train the machine learning module comprises:
    executing the machine learning module with the input to produce a current output value of the storage device that failed;
    determining a margin of error of the current output value and the first output value indicating no expected remaining life of the storage device that failed; and
    using the margin of error and the input to train weights and biases of nodes in the machine learning module to produce the first output value indicating no expected remaining life of the storage device.

3. The computer program product of claim 1, wherein the operations further comprise:
    storing storage attributes for the storage device at different time periods; and
    in response to detecting the failure of the storage device, further performing:
        for each stored storage attributes at a time period, of the different time periods, of the stored storage attributes, performing:
            determining an actual remaining life as a function of a time the storage device failed and the time period of the stored storage attributes; and
            using the stored storage attributes to train the machine learning module to produce a current output value indicating the actual remaining life of the storage device that failed at the time period of the stored storage attributes.

4. The computer program product of claim 3, wherein to train the machine learning module for the stored storage attributes at the time period comprises:
    executing the machine learning module with the storage attributes at the time period to produce the current output value for the time period;
    determining a margin of error of the current output value for the time period and the actual remaining life of the storage device that failed at the time period of the stored storage attributes; and
    using the margin of error and the storage attributes at the time period to train weights and biases of nodes in the machine learning module to produce the current output value corresponding to the actual remaining life of the storage device.

5. The computer program product of claim 1, wherein the input further includes static storage attributes that do not change over time.

6. The computer program product of claim 1, wherein the machine learning module produces output values from storage attributes for storage devices used by different computing systems, wherein each computing system of the computing systems maintains storage attributes for the storage devices used at the computing system, wherein the operations further comprise:

receiving, from the computing systems, the storage attributes for the storage devices at the computing systems, wherein the retraining the machine learning module with the storage attributes to produce the first output value indicating no remaining life comprises retraining the machine learning module with the input comprising the storage attributes from the computing systems for storage devices that failed at the computing systems, and wherein the executing the machine learning module to produce the second output value after the retraining the machine learning module comprises after the retraining the machine learning module for the storage devices that failed deployed at the computing systems, executing the machine learning module to produce additional output values for the computing systems based on dynamic storage attributes of operational storage devices at the computing system to determine an expected remaining life of each of the operational storage devices deployed at the computing systems.

7. A system for determining when to replace a storage device, comprising:
   a processor; and
   a computer readable storage medium storing computer readable program code that when executed by the processor performs operations, the operations comprising:
      updating storage attributes for the storage device in response to access requests to the storage device;
      training a machine learning module to produce output values indicating remaining life at different times based on input comprising the storage attributes for the storage device at the different times;
      after training the machine learning module, detecting a failure of the storage device;
      in response to detecting the failure of the storage device, performing:
         determining input comprising the storage attributes of the storage device that failed; and
         using the input to retrain the machine learning module to produce a first output value indicating no expected remaining life of the storage device, wherein the machine learning module is retrained at multiple points-in-time to improve a predictive accuracy of determining the expected remaining life to determine when to replace the storage device, including predictive accuracy of determining no expected remaining life; and
      after the retraining the machine learning module for the storage device that failed, executing the machine learning module to produce a second output value based on current storage attributes of an operational storage device to determine an expected remaining life of the operational storage device.

8. The system of claim 7, wherein to train the machine learning module comprises:
   executing the machine learning module with the input to produce a current output value of the storage device that failed;
   determining a margin of error of the current output value and the first output value indicating no expected remaining life of the storage device that failed; and
   using the margin of error and the input to train weights and biases of nodes in the machine learning module to produce the first output value indicating no expected remaining life of the storage device.

9. The system of claim 7, wherein the operations further comprise:
   storing storage attributes for the storage device at different time periods; and
   in response to detecting the failure of the storage device, further performing:
      for each stored storage attributes at a time period, of the different time periods, of a plurality of the stored storage attributes at the different time periods, performing:
         determining an actual remaining life as a function of a time the storage device failed and the time period of the stored storage attributes; and
         using the stored storage attributes to train the machine learning module to produce current output value indicating the actual remaining life of the storage device that failed at the time period of the stored storage attributes.

10. The system of claim 9, wherein to train the machine learning module for the stored storage attributes at the time period comprises:
   executing the machine learning module with the storage attributes at the time period to produce the current output value for the time period;
   determining a margin of error of the current output value for the time period and the actual remaining life of the storage device that failed at the time period of the stored storage attributes; and
   using the margin of error and the storage attributes at the time period to train weights and biases of nodes in the machine learning module to produce the current output value corresponding to the actual remaining life of the storage device.

11. A computer implemented method performed in a computer system for determining when to replace a storage device deployed within a computing environment, comprising:
   updating storage attributes for the storage device in response to access requests to the storage device;
   training a machine learning module to produce output values indicating remaining life at different times based on input comprising the storage attributes for the storage device at the different times;
   after training the machine learning module, detecting a failure of the storage device;
   in response to detecting the failure of the storage device, performing:
      determining input comprising the storage attributes of the storage device that failed; and
      using the input to retrain the machine learning module to produce a first output value indicating no expected remaining life of the storage device, wherein the machine learning module is retrained at multiple points-in-time to improve a predictive accuracy of determining the expected remaining life to determine when to replace the storage device, including predictive accuracy of determining no expected remaining life; and
   after the retraining the machine learning module for the storage device that failed, executing the machine learning module to produce a second output value based on current storage attributes of an operational storage device to determine an expected remaining life of the operational storage device.

12. The method of claim 11, wherein to train the machine learning module comprises:
   executing the machine learning module with the input to produce a current output value of the storage device that failed;
   determining a margin of error of the current output value and the first output value indicating no expected remaining life of the storage device that failed; and
   using the margin of error and the input to train weights and biases of nodes in the machine learning module to produce the first output value indicating no expected remaining life of the storage device.

13. The method of claim 11, further comprising:
   storing storage attributes for the storage device at different time periods; and
   in response to detecting the failure of the storage device, further performing:
      for each stored storage attributes at a time period, of the different time periods, of the stored storage attributes at the different time periods, performing:
         determining an actual remaining life as a function of a time the storage device failed and the time period of the stored storage attributes; and
         using the stored storage attributes to train the machine learning module to produce a current output value indicating the actual remaining life of the storage device that failed at the time period of the stored storage attributes.

14. The method of claim 13, wherein to train the machine learning module for the stored storage attributes at the time period comprises:
   executing the machine learning module with the storage attributes at the time period to produce the current output value for the time period;
   determining a margin of error of the current output value for the time period and the actual remaining life of the storage device that failed at the time period of the stored storage attributes; and
   using the margin of error and the storage attributes at the time period to train weights and biases of nodes in the machine learning module to produce the current output value corresponding to the actual remaining life of the storage device.

15. The computer program product of claim 1, wherein the second output value from the machine learning module comprises a number from zero to one used to determine an expected remaining lifespan of the storage device, and wherein the expected remaining lifespan comprises at least one of a time value, a number of write cycles, and number of writes per time period.

16. The computer program product of claim 1, wherein the storage attributes used as the input to the machine learning module include a plurality of:
   a response time to respond to read and write requests to the storage device;
   a response time to respond to read and write requests to a storage array including the storage device;
   for each of at least one error type, a number of errors of the error type in a specified time interval;
   a type of the storage device;
   a manufacturer of the storage device;
   a storage capacity of the storage device;
   a time of first use of the storage device;
   a firmware level of the storage device;
   a read operations per second at the storage device;
   an expected remaining lifespan of the storage device; and
   write operations per second at the storage device.

17. The system of claim 7, wherein the input further includes static storage attributes that do not change over time.

18. The system of claim 7, wherein the machine learning module produces output values from storage attributes for storage devices used by different computing systems, wherein each computing system of the computing systems maintains storage attributes for the storage devices used at the computing system, wherein the operations further comprise:
   receiving, from the computing systems, the storage attributes for the storage devices at the computing systems,
   wherein the retraining the machine learning module with the storage attributes to produce the first output value indicating no remaining life comprises retraining the machine learning module with the input comprising the storage attributes from the computing systems for storage devices that failed at the computing systems, and
   wherein the executing the machine learning module to produce the second output value after the retraining the machine learning module comprises after the retraining the machine learning module for the storage devices that failed deployed at the computing systems, executing the machine learning module to produce additional output values for the computing systems based on dynamic storage attributes of operational storage devices at the computing system to determine an expected remaining life of each of the operational storage devices deployed at the computing systems.

19. The system of claim 7, wherein the second output value from the machine learning module comprises a number from zero to one used to determine an expected remaining lifespan of the storage device, and wherein the expected remaining lifespan comprises at least one of a time value, a number of write cycles, and number of writes per time period.

20. The system of claim 7, wherein the storage attributes used as the input to the machine learning module include a plurality of:
   a response time to respond to read and write requests to the storage device;
   a response time to respond to read and write requests to a storage array including the storage device;
   for each of at least one error type, a number of errors of the error type in a specified time interval;
   a type of the storage device;
   a manufacturer of the storage device;
   a storage capacity of the storage device;
   a time of first use of the storage device;
   a firmware level of the storage device;
   a read operations per second at the storage device;
   an expected remaining lifespan of the storage device; and
   write operations per second at the storage device.

21. The method of claim 11, wherein the input further includes static storage attributes that do not change over time.

22. The method of claim 11, wherein the machine learning module produces output values from storage attributes for storage devices used by different computing systems, wherein each computing system of the computing systems maintains storage attributes for the storage devices used at the computing system, further comprising:
   receiving, from the computing systems, the storage attributes for the storage devices at the computing systems,
   wherein the retraining the machine learning module with the storage attributes to produce the first output value indicating no remaining life comprises retraining the machine learning module with the input comprising the storage attributes from the computing systems for storage devices that failed at the computing systems, and wherein the executing the machine learning module to produce the second output value after the retraining the machine learning module comprises after retraining the machine learning module for the storage devices that failed deployed at the computing systems, executing the machine learning module to produce additional output values for the computing systems based on dynamic storage attributes of operational storage devices at the computing system to determine an expected remaining life of each of the operational storage devices deployed at the computing systems.

23. The method of claim 11, wherein the second output value from the machine learning module comprises a number from zero to one used to determine an expected remaining lifespan of the storage device, and wherein the expected remaining lifespan comprises at least one of a time value, a number of write cycles, and number of writes per time period.

24. The method of claim 11, wherein the storage attributes used as the input to the machine learning module include a plurality of:

a response time to respond to read and write requests to the storage device;

a response time to respond to read and write requests to a storage array including the storage device;

for each of at least one error type, a number of errors of the error type in a specified time interval;

a type of the storage device;

a manufacturer of the storage device;

a storage capacity of the storage device;

a time of first use of the storage device;

a firmware level of the storage device;

a read operations per second at the storage device;

an expected remaining lifespan of the storage device; and write operations per second at the storage device.

* * * * *